United States Patent [19]

Kobayashi et al.

[11] Patent Number: 4,484,441
[45] Date of Patent: Nov. 27, 1984

[54] EXHAUST GAS PURIFICATION APPARATUS

[75] Inventors: Hideo Kobayashi, Kawagoe; Yohji Fukutomi, Sayama; Masahiko Asakura, Tokorozawa; Eiji Kishida, Funabashi, all of Japan

[73] Assignee: Honda Giken Kogyo Kabushiki Kaisha, Tokyo, Japan

[21] Appl. No.: 510,242

[22] Filed: Jul. 1, 1983

[30] Foreign Application Priority Data

Jul. 1, 1982 [JP] Japan ............................... 57-112514

[51] Int. Cl.$^3$ ............................................... F01N 3/22
[52] U.S. Cl. ........................................ 60/285; 60/290; 60/293
[58] Field of Search ......................... 60/285, 290, 293

[56] References Cited

U.S. PATENT DOCUMENTS 3,751,916  8/1923  Hayashida ............................. 60/290
4,137,713  2/1979  Takeda et al. ........................ 60/276
4,376,427  3/1983  Mizuno ................................. 60/293

FOREIGN PATENT DOCUMENTS 56-27018  3/1981  Japan .

Primary Examiner—Douglas Hart
Attorney, Agent, or Firm—Armstrong, Nikaido, Marmelstein & Kubovcik

[57] ABSTRACT

An improvement in an exhaust gas purification apparatus wherein a detector senses the operation of a device for injecting additional intake air into the intake passage and triggers a timing unit. The timing unit produces a signal for a predetermined amount of time which holds open a control valve for introducing secondary air into the exhaust passage ahead of the catalytic converter. This structure enables the reduction of harmful components of the exhaust gas produced during a gear-change operation of the engine without greatly overheating the catalytic converter.

3 Claims, 2 Drawing Figures

EXHAUST GAS PURIFICATION APPARATUS

BACKGROUND OF THE INVENTION

This invention relates to an exhaust gas purification apparatus in an internal combustion engine wherein harmful exhaust gas components such as CO, HC and others are decreased at the catalytic converter, by supplying secondary air to the exhaust passage.

A known exhaust gas purification apparatus for an internal combustion engine includes a means for injecting additional intake air into the intake passage and a means for introducing secondary air into the exhaust passage. The means for injecting additional intake air includes a valve interposed in a passage connected to the intake passage of the engine on the downstream side of the throttle valve. It is arranged to open for a predetermined time by a rapid increase of intake negative pressure and inject additional intake air into the intake passage. The secondary air introducing means includes a control valve interposed in a passage connected to the exhaust passage of the engine on the upstream side of the catalytic converter. It is arranged to open at the time of low load operation of the engine and introduce secondary air into the exhaust passage. The injection of additional intake air prevents the air-fuel ratio of the intake mixture gas from being too rich at the initial period of engine starting, at the initial period of deceleration, at the time of gear changing operation or the like when the intake negative pressure is rapidly increased. Additionally, at the time of low load operation such as idling, deceleration or the like, the harmful ingredients in the exhaust gas are burned in the catalytic converter by the introduction of the secondary air to the exhaust passage. Furthermore, an excess of the secondary air cools the catalytic converter to prevent it from overheating.

In this type of apparatus, the introduction of the secondary air to the exhaust passage is stopped at the time of high load operation of the engine. This is because in the high load operation, the amount and temperature of exhaust gas increases. Therefore, if the secondary air is introduced, overheating damage of the catalytic converter would be likely.

Accordingly, for improving the purification of the exhaust gases at the time of high load operation, it is necessary that the air-fuel ratio of the mixture be set to be lower than the theoretical air-fuel ratio. If, however, the air-fuel ratio is set to become too lean the responsiveness and power of the engine are lowered. In order to keep the engine parameters satisfactory, it becomes necessary that the air-fuel ratio be set on the lean side near the theoretical air-fuel ratio.

If, however, the air-fuel ratio is so set near the theoretical ratio, the harmful components, especially CO, are generated at the time of gear change operation in the midst of the high load operation. It then becomes necessary to remove the same in the catalytic converter by introduction of secondary air. It can be considered, in this case, that the introduction of secondary air can be carried out by utilizing the means for injecting additional intake air which is operated at the time of gear change operation, but sufficient introduction of the air for such a short time cannot be carried out. If, in reverse thereto, the length of time for the introduction of air is prolonged, overheating of the catalytic converter is caused in the high load operation subsequent to the gear change operation.

OBJECTS AND SUMMARY OF THE INVENTION

It is an object of the present invention to provide an improvement in an exhaust gas purification apparatus that reduces harmful components in the exhaust gas produced during a gear change operation of the engine.

It is a further object of the invention to enable cooling of the catalytic converter at the time of high load operation immediately subsequent to a gear change operation.

These and other objects are attained in an improvement in an exhaust gas purification apparatus wherein the apparatus has certain additional structure. The apparatus is fitted to an internal combustion engine having an intake passage, a throttle valve in the intake passage, an exhaust passage, and a catalytic converter in the exhaust passage. The apparatus includes means for injecting additional intake air into the intake passage downstream of the throttle valve upon a rapid increase of intake negative pressure, and means for introducing secondary air into the exhaust passage upon low load operation of the engine. The secondary air introducing means includes an air introduction passage connected between atmosphere and the exhaust passage at a position upstream of the catalytic converter, and a control valve in the introduction passage.

The improvement comprises detecting means for detecting the operation of the means for injecting and thereupon producing an operation signal, and control means for opening the control valve for a predetermined amount of time in response to the operation signal.

The control valve can be a negative pressure operated valve. That is, upon an increase in negative pressure to the valve, it opens. The apparatus can further include a negative pressure passage connected between the intake passage and the valve, an electromagnetic valve in the negative pressure passage, and means for operating the electromagnetic valve upon low load operation of the engine. The detecting means can comprise an electric switch operatively coupled to the injection means to be closed when the injection means is operated. The control means can comprise a timer means electrically connected between the switch and the electromagnetic valve for generating an electric signal for the predetermined amount of time to the electromagnetic valve upon closing of the switch thereby holding the control valve open for the predetermined amount of time. A check valve can be provided in the negative pressure passage between the intake passage and the electromagnetic valve permitting flow only in the direction of the intake passage away from the electromagnetic valve. A negative pressure surge tank can be connected to the negative pressure passage between the check valve and the electromagnetic valve.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
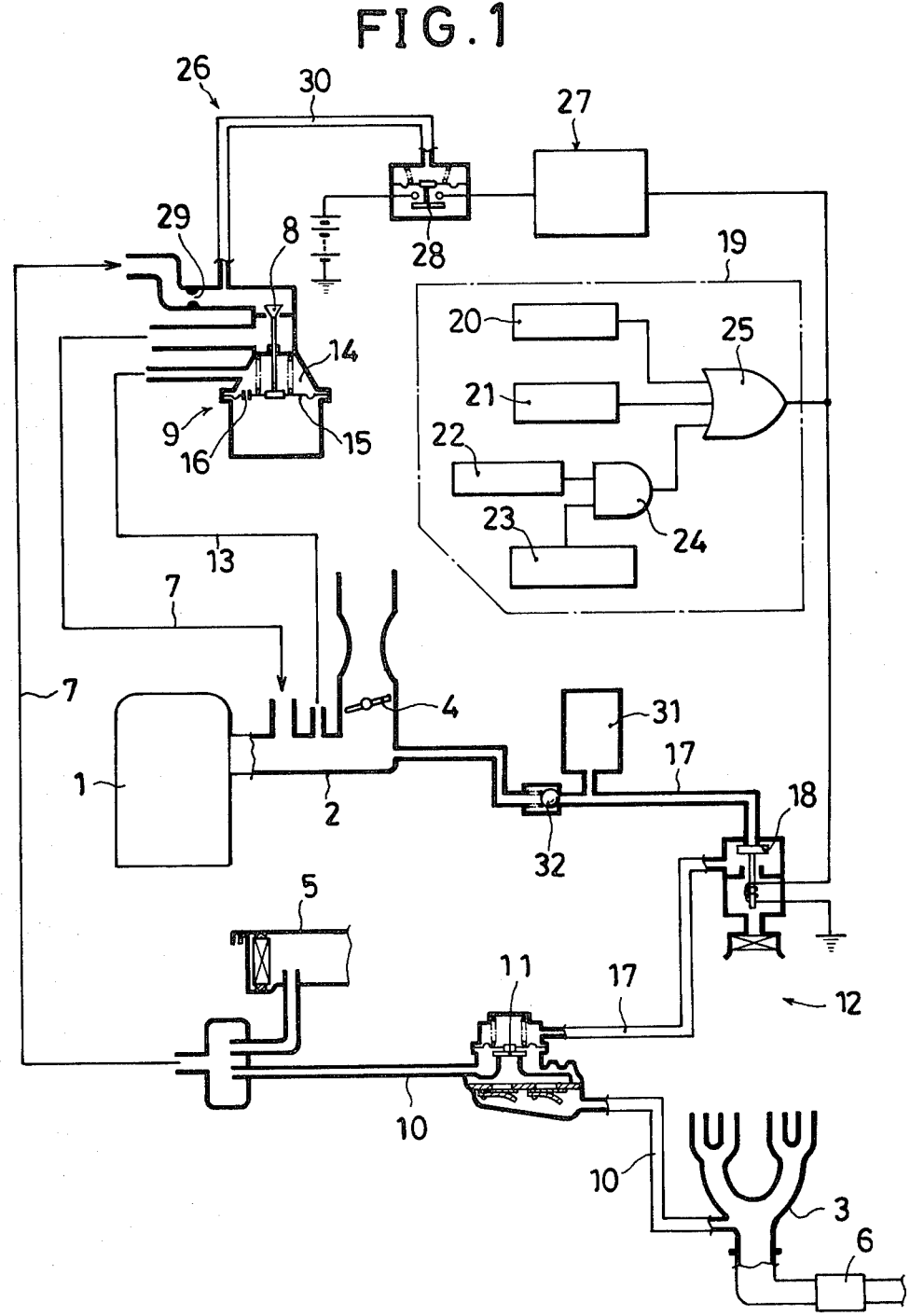
FIG. 1 is a diagram showing one example of this invention apparatus.

One embodying example of this invention will be explained with reference to the accompanying drawing:

Referring to the drawing, a main body 1 of an internal combustion engine has an intake passage 2 and an exhaust passage 3. The intake passage 2 is provided with a throttle valve 4 interposed therein and an air cleaner 5 located on an upstream end portion thereof. The exhaust passage 3 is provided with a catalytic converter 6 interposed therein.

Additionally, the intake passage 2 is provided with means 9 for injecting additional intake air comprising an air introducing passage 7 connected to the intake passage 2 at position located on a downstream side of the throttle valve 4, and a valve 8 interposed in the introducing passage 7. The exhaust passage 3 is provided with a means 12 for introducing secondary air comprising an air introducing passage 10 connected at its one end to exterior air and at its other end to the exhaust passage 3 at a position located on an upstream side of the catalytic converter 6, and a control valve 11 interposed in the introducing passage 10.

More in detail, the injection means 9 is arranged so that a rapid increase in intake negative pressure in the intake passage 2 such as at the initial period of engine deceleration, at the initial period of engine starting operation, at the time of gear change operation or the like is transmitted through negative pressure passage 13 into a negative pressure chamber 14 and opens the valve 8 for a predetermined amount of time to inject additional intake air into the intake passage 2. The additional air serves to prevent the mixture in the intake passage 2 from becoming too rich. A diaphragm 15 on the front surface of the negative pressure chamber 14 is provided with an orifice 16 so that the operation time of the valve 8, that is, the operation time of the chamber 14 (0.5-1 sec., for instance,) is determined by the orifice 16 and the capacity of the chamber 14.

The foregoing injection means 9 is not especially different from a conventional apparatus.

More in detail, the secondary air introducing means 12 is arranged so that the control valve 11 thereof is composed of a negative pressure operated valve arranged to be opened by having intake negative pressure applied thereto through a negative pressure passage 17 connected to the intake passage 2. An electromagnetic valve 18 interposed in the negative pressure passage 17 is arranged to open at the time of low load operation by an output signal from a control unit 19 to apply intake negative pressure in the intake passage 2 to negative pressure chamber of the control valve 11 and open the valve 11. Consequently, if the valve 11 is opened, secondary air is introduced therethrough into the exhaust passage 3 and serves to decrease the harmful components in the exhaust gas in the catalytic converter 6 and to cool the catalytic converter 6 to prevent it from overheating.

The control unit 19 comprises an engine speed switch 20 arranged to output an ON signal at the time of low speed operation below 1400 r.p.m., for instance; a negative pressure switch 21 arranged to output on ON signal at the time of deceleration wherein the intake negative pressure becomes above 550 mm Hg., for instance, an engine speed switch 22 arranged to output on an ON signal when the engine speed is below 3000 r.p.m., for instance, an engine cooling water temperature switch 23 arranged to output on an ON signal when a cooling water temperature is below 70° C., for instance; an AND gate 24 arranged to output on an ON signal when both the engine speed switch 22 and the water temperature switch 23 output the respective ON signals, that is, when the engine is started in its cold condition; and an OR gate 25 arranged to output an ON signal when any of the engine speed switch 20, the negative pressure switch 21 and the AND gate 24 outputs an ON signal, that is, at the time of such a low load operation as low speed operation, the deceleration operation, cold starting operation or the like.

Referring to the drawing, a detecting means 26, for detecting the operation of the injection means 9, and a control means 27 for opening the control valve 11 for a predetermined time in response to an operation signal of the detecting means 26 are provided. In the illustrated example, the detecting means 26 comprises a negative pressure operated switch 28 arranged to be operated in conjunction with the operation of the injection means 9. More in detail, the foregoing passage 7 is provided with a jet orifice 29 therein on an upstream side of the valve 8, so that when the injection means 9 is operated, a negative pressure generated between the jet 29 and the valve 8 is applied through a negative pressure passage 30 to the switch 28 to close the switch 28.

The control means 27 comprises a timer unit arranged to generate an output by the closing, that is, the "ON" position of the switch 28 and continue the generation of the output for a predetermined time totalling a predetermined time of the ON of the switch 28 (0.5-1 sec.) and a predetermined time after the OFF of the switch 28 (1-4 sec., for instance,). The foregoing electromagnetic valve 18 is opened by the output thereof and accordingly the valve 11 is opened by application of the negative pressure to the control valve 11 through the negative pressure passage 17.

In the illustrated example, a negative pressure surge tank 31 is connected to the negative pressure passage 17. The passage 17 is connected through a check valve 32 to the intake passage 2. In this manner, even when the intake negative pressure is lowered after a gear change operation, the control valve 11 can be kept in its open condition for the set time of the timer unit 27 by a negative pressure stored in the tank 31.

Next, the operation of the apparatus will be explained as follows:

During the time of operation of the engine, the secondary air introducing means 12 is operated at the time of low load operation of the engine, that is, in idling, deceleration operation or cold starting operation, to cause secondary air to be introduced into the exhaust passage 3, whereby the harmful components in the exhaust gas are decreased and the catalytic converter 6 is also cooled and protected. On the other hand, at the initial period of starting operation, at the initial period of deceleration operation or at the time of gear change operation, the additional intake air injection means 9 is operated to prevent the mixture in the intake passage 2 from becoming too rich. Additionally, the operation of the injection means 9 is detected by the closing of the switch 28 of the detecting means 26. The timer unit 27 operated by this closing serves to generate an output signal continued for a predetermined time, (1-4 sec., for instance) and open the electromagnetic valve 18 for a predetermined time. The control valve 11 opened by the operation of the valve 18 serves to supply secondary air into the exhaust passage 3 for a predetermined time. Thus, the harmful components in the exhaust gas, especially CO, are burned by the catalytic converter 6. Because the supply of secondary air to the exhaust passage 3 is short in time, the temperature of the catalytic converter 6 does not rise too high at the time of such a high load operation as the subsequent pedalling of an acceleration pedal.

Figure 2:
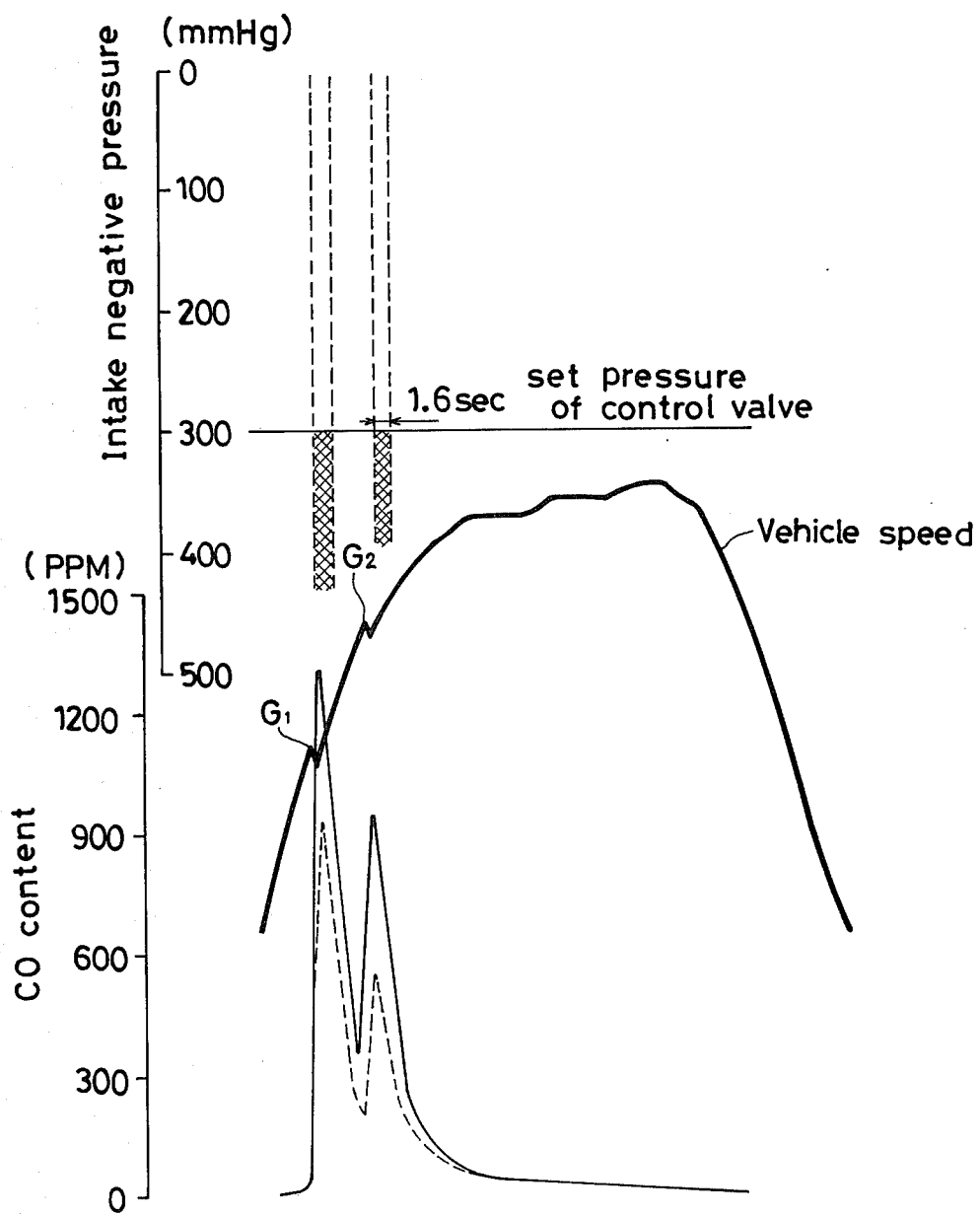
FIG. 2 is a diagram showing the amount of harmful components in the exhaust gas at the time of change of the vehicle speed in the case of this invention and in the case of the conventional apparatus.

FIG. 2 is a diagram showing certain test results in which, when the air-fuel ratio of the mixture is set to be on the lean side near the theoretical air-fuel ratio, for instance, (A/F=15-18), and the vehicle speed is accelerated with two gears changed from $G_1$ to $G_2$, the amount of the harmful component (CO) in the case of this invention and htat in the case of the conventional apparatus lacking the means 27, 27 are measured and plotted to obtain a dotted curve of this invention and a solid curve of the conventional case. It has been found therefrom that this invention reduces the content of the harmful component (CO) remarkably more than the conventional apparatus. In the case of this invention, the control valve 11 is operated, as shown by cross-hatched sections in the same Figure, by being applied for 1.6 sec. with a negative pressure of about 400 mm Hg from the surge tank 31 of a capacity of 280 c.c. In this test, the operation pressure of the control valve 11 is so set to be 300 mm Hg.

Instead of the negative pressure operated switch 28 arranged to detect the operation of the injection means 9 as shown in the foregoing example, a switch arranged to be closed in mechanical conjunction with the opening operation of the valve 8 of the injection means 9 may be used for the detecting means 26.

Thus, according to this invention, the operation of the injection means arranged to be operated by a rapid increase of the intake negative pressure at the time of gear change operation or the like is detected. By the detection, the control valve is opened for a predetermined time for introducing the secondary air for a predetermined time into the exhaust passage. In this manner, the harmful components in the exhaust gas are burned in the catalytic converter by the introduced secondary air. The catalytic converter is cooled so that no overheating occurs even at the time of high load operation subsequent to the gear change operation. In addition, the harmful components in the exhaust gas at the time of gear change operation are decreased remarkably, and the air-fuel ration of the mixture can be set near the theoretical air-fuel ratio. In this manner, the responsiveness and power of the engine are not lowered. Additionally, even if there are individual variations in driving technique which have a large influence on generation of the harmful components at the time of gear change operation of the vehicle or even if the vehicle is increased in weight (if the weight thereof is increased, the deceleration degree is increased and consequently generation of the harmful components in the exhaust gas is increased), the removal effect of the harmful components in the exhaust gas according to this invention apparatus is not obstructed thereby.

It is readily apparent that the above-described improvement in exhaust gas purification meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. In an exhaust gas purification apparatus for an internal combusion engine, the engine including an intake passage, a throttle valve in the intake passage, an exhaust passage, and a catalytic converter in the exhaust passage, the apparatus including means for injecting additional intake air into the intake passage downstream of the throttle valve upon a rapid increase of intake negative pressure therein, and means for introducing secondary air into the exhaust passage upon low load operation of the engine, the secondary air introducing means including an air introduction passage connected between atmosphere and the exhaust passage at a position upstream of the catalytic converter, and a control valve on the introduction passage; the improvement wherein the apparatus further comprises detecting means for detecting the operation of the means for injecting and thereupon producing an operation signal, and control means for opening the control valve for a predetermined amount of time in response to said operation signal.

2. The improvement as claimed in claim 1, wherein said control valve is a negative pressure operated valve; the apparatus further includes a negative pressure passage connected between the intake passage and said negative pressure operated valve, an electromagnetic valve in said negative pressure passage, and means for operating said electromagnetic valve upon low load operation of the engine; said detecting means comprises an electric switch operatively coupled to the injection means to be closed when the injection means is operated; and said control means comprises a timer means electrically connected between said switch and said electromagnetic valve for generating an electric signal for said predetermined amount of time to said electromagnetic valve upon closing of said switch thereby holding said control valve open for said predetermined amount of time.

3. The improvement as claimed in claim 2, further comprising a check valve in said negative pressure passage between said intake passage and said electromagnetic valve permitting flow only away from said electromagnetic valve, and a negative pressure surge tank connected to said negative pressure passage between said check valve and said electromagnetic valve.

* * * * *